TREATMENT TABLE

Filed June 17, 1959 5 Sheets-Sheet 1

INVENTORS
CHARLES C. HONSAKER
WILLIAM S. ASELTINE
BY Leo Edelson
ATTORNEY

INVENTORS.
CHARLES C. HONSAKER
WILLIAM S. ASELTINE
BY Leon Edelson
ATTORNEY

INVENTORS
CHARLES C. HONSAKER
WILLIAM S. ASELTINE

BY [signature]

ATTORNEY

Oct. 30, 1962 C. C. HONSAKER ET AL 3,060,925

TREATMENT TABLE

Filed June 17, 1959 5 Sheets-Sheet 4

INVENTORS
CHARLES C. HONSAKER
WILLIAM S. ASELTINE
BY Lea Edelson
ATTORNEY

TREATMENT TABLE

Filed June 17, 1959 5 Sheets-Sheet 5

INVENTORS.
CHARLES C. HONSAKER
BY WILLIAM S. ASELTINE
Leon Edelson
ATTORNEY

United States Patent Office
3,060,925
Patented Oct. 30, 1962

3,060,925
TREATMENT TABLE

Charles C. Honsaker, Philadelphia, and William S. Aseltine, Devon, Pa.; said Aseltine assignor to said Honsaker Filed June 17, 1959, Ser. No. 821,016
5 Claims. (Cl. 128—25)

This invention relates to medical treatment tables, and more particularly, relates to a medical treatment table whose purpose is to achieve by mechanical means the re-relaxation of the muscle structure of the human body, the tranquilization of the nervous system, and the improvement of circulation throughout both the blood system and the lymphatic system.

It is well known that the circulatory systems of the body serve the prime functions of carrying nourishment to the various body tissues and also removing waste products therefrom and carrying such waste products to the organs of the body whose function is to eliminate such waste, as for example the lungs and the kidneys. Upright bipeds such as man, because of their particular skeletal organization normally spend practically all of their lives in either an upright or a prone position. In the upright position, such as in standing or sitting, the head is always higher than the feet in a gravity sense and the spinal column is always in compression. In the normal prone position, such as when sleeping, the various parts of the body are substantially horizontal. However, in the general routine of living most people rarely if ever assume body positions which result in the head being lower than the feet in a gravity sense or in the spinal column being placed in tension.

As a result of the foregoing, the body circulatory systems rarely work at one hundred percent efficiency. Circulation may be slowed down resulting in insufficient blood supply to the various organs of the body and the extremities of the limbs. Moreover, the brain, which is the most critical organ in the human body with regard to the necessity for receiving an ample supply of blood, is physically located in the worst possible position to receive such blood supply. It has been found in practice that improved circulation of the blood and lymphatic systems and the elimination of congestion within these systems is highly beneficial in the treatment of certain diseases and abnormal body conditions, as for example Buerger's disease, the reducing of blood cholesterol level, the alleviation of head colds and sinus conditions, and the treatment of circulatory disorders such as varicose veins. Improved circulation also results in greater muscle tone and the improvement of the general condition of the tendons and nervous system. Accordingly, it is a primary purpose of our invention to provide novel apparatus for markedly improving the efficiency of the circulatory systems of the body.

Another object of our invention is to provide novel apparatus for relieving tissue congestion by alternately flushing and draining the body tissues of the fluid normally present therein.

Yet another object of our invention is to provide novel apparatus which causes cervical, thoracic, and lumbar traction of the spinal column by causing intervertebral separation.

Yet another object of our invention is to provide novel apparatus for optionally combining traction effects with the treatment resulting in the improvement of circulation.

The foregoing and other objects of our invention will become apparent from a careful reading of the following specification in conjunction with an examination of the appended drawings, wheren:

Figures 4, 10:
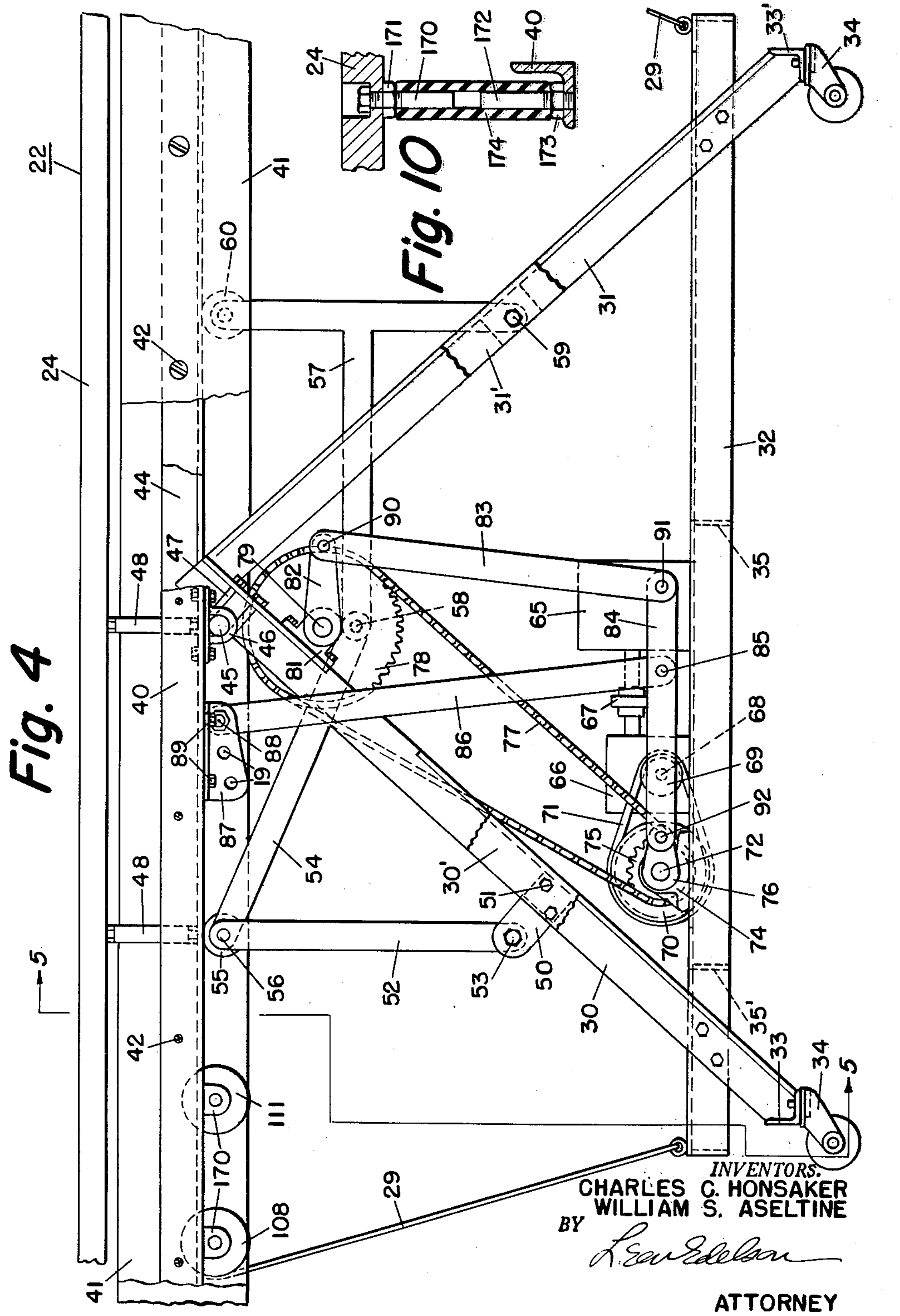
FIGURE 4 is a rear elevational view of the treatment table illustrated in FIGURE 1 as seen when viewed from the rear of the table with portions of the table broken away to reveal the mechanical details housed within the casework of the table, and also illustrates the view that would be seen when taken along the lines 4—4 of FIGURE 5.
Figure 5:
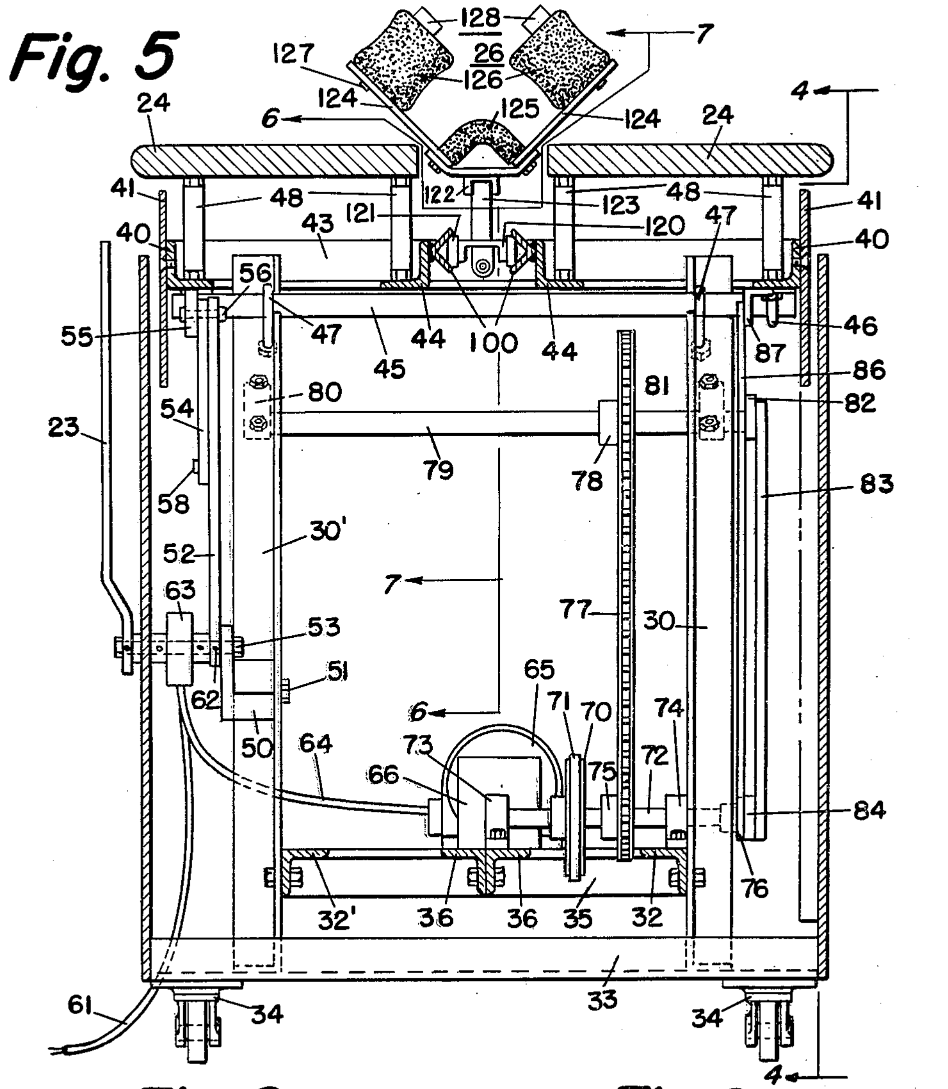
FIGURE 5 is a sectional view through the treatment table as viewed along the lines 5—5 of FIGURE 4 and corresponds to an end elevation when looking into the table endwise from the head end with certain portions of the table and the housing broken away to reveal mechanical details of the internal structure.
Figures 8, 9:
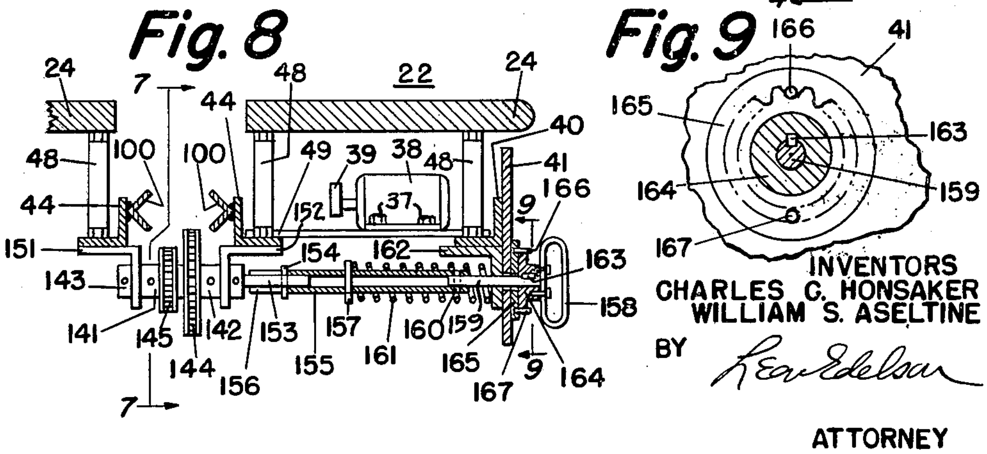
Figures 6, 7:
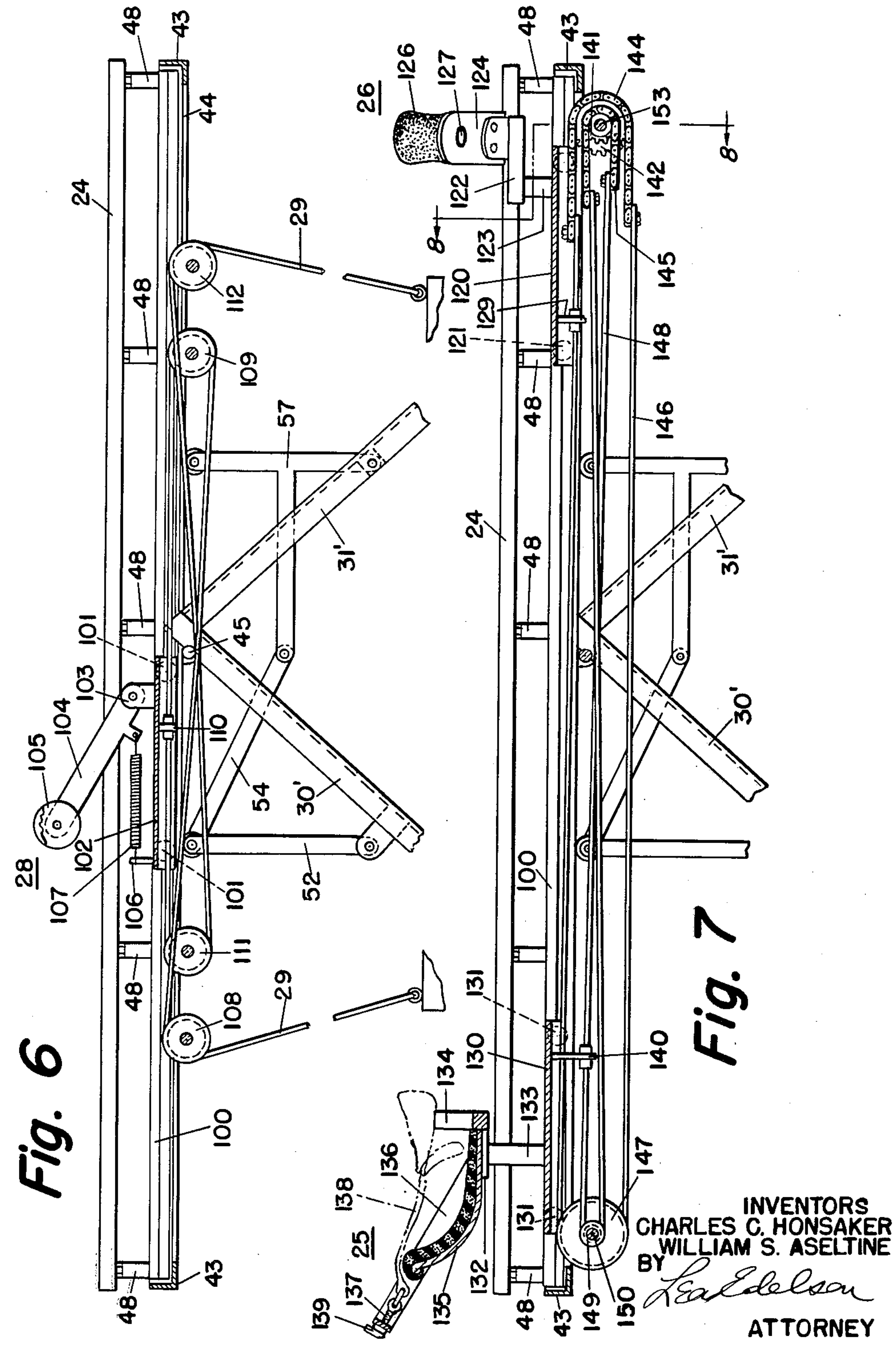
FIGURE 6 is a sectional view taken along the lines 6—6 of FIGURE 5 to illustrate the structure and operational aspects of the traveling roller which runs longitudinally centrally for a certain distance along the length of the treatment table.
Figures 11, 12, 13, 14:
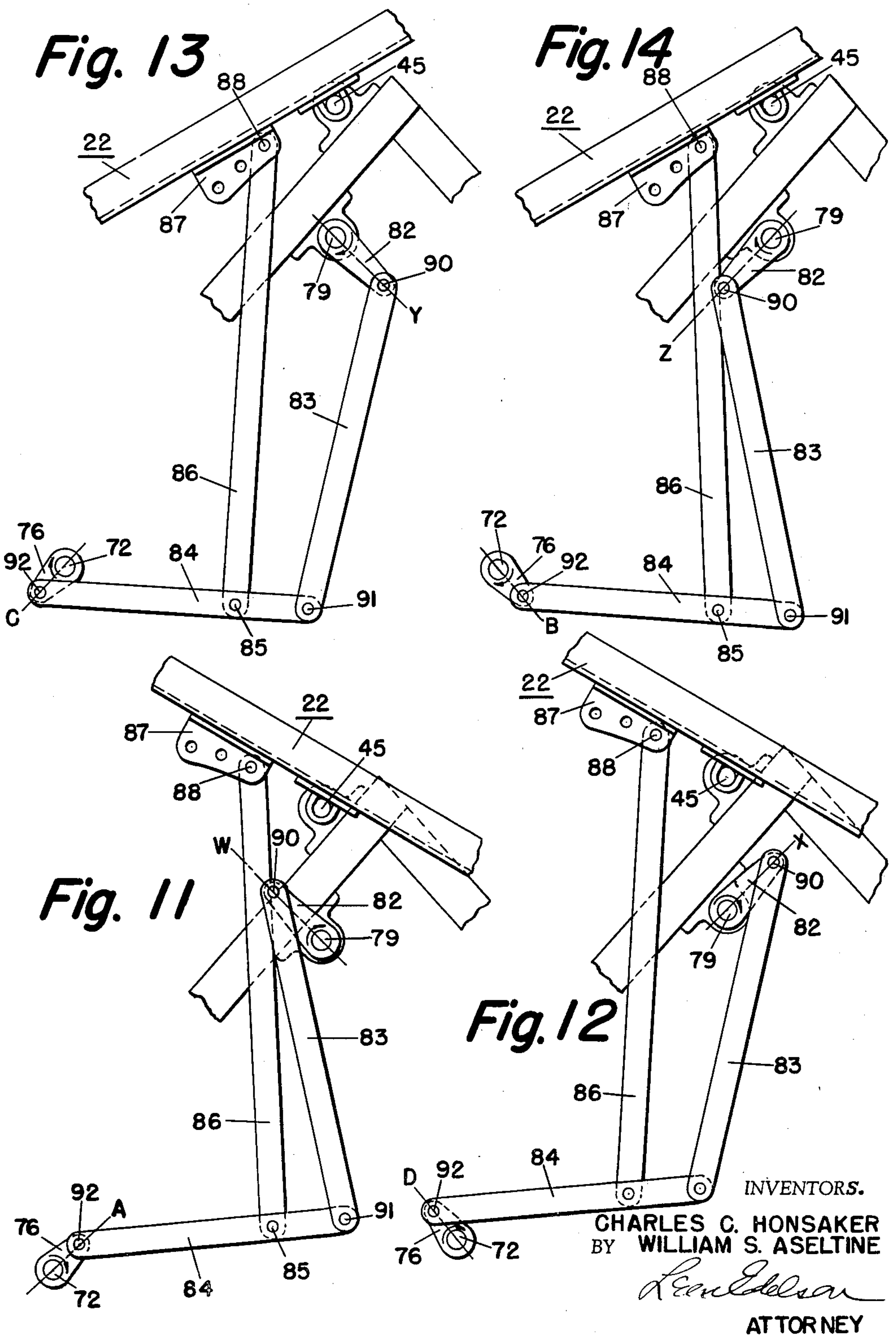

FIGURE 7 is a side elevational view which shows the apparatus for longitudinally adjusting the head sling and foot locking carriages longitudinally of the table as would be seen when viewed along the lines 7—7 of FIGURE 5 or along the lines 7—7 of FIGURE 8. The showing of FIGURE 5 specifically omits the apparatus seen in FIGURES 6 and 7 because the details of these latter two figures would be completely obscured if included on the showing of FIGURE 5. The inclusion of the lines 6—6 and 7—7 on the showing of FIGURE 5 is for the purpose of clearly orienting the structures of FIGURES 6 and 7 into the total apparatus;

FIGURE 8 is an end view of certain details of the adjustment and locking apparatus used in connection with the head sling and foot locking carriages and is located in such position within the machine that it would be seen when viewed along the lines 8—8 of FIGURE 7;

FIGURE 9 is a fragmented view of a portion of the head sling and foot clamping carriages locking device as seen when viewed along the lines 9—9 of FIGURE 8;

FIGURE 10 is an enlarged sectional detail view of the support means which connect the patient supporting portion of the table top with the underlying table top frame structure;

FIGURES 11 through 14 illustrate the various mechanical relationships amongst elements of the mechanism which cause the table to oscillate cyclically during the course of operation of the apparatus. FIGURES 11 and 12 are correlated with the position of the table as seen in FIGURE 2, and FIGURES 13 and 14 are correlated with the position of the table as seen in FIGURE 3.

Figure 15:
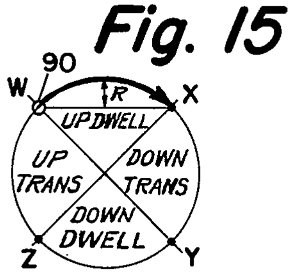
Figures 2, 16:
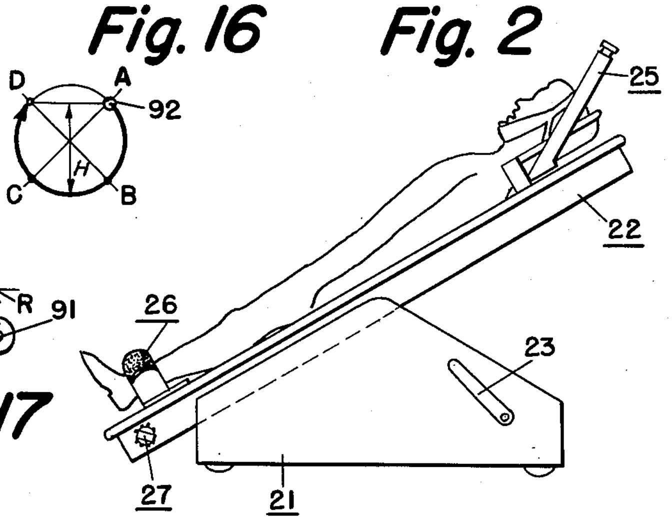
FIGURE 2 is a front elevational view of the treatment table seen in FIGURE 1 and illustrating the table with a patient lying thereon in head-up position.
Figure 17:
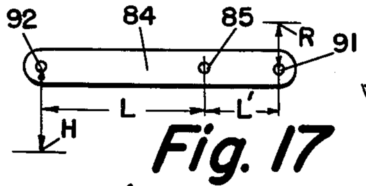

FIGURES 15, 16 and 17 are diagrammatic illustrations of the paths traced by certain points in the driving system for the table top resulting in the cycle of operation obtained.

In the several figures like elements are denoted by like reference characters.

Figure 1:
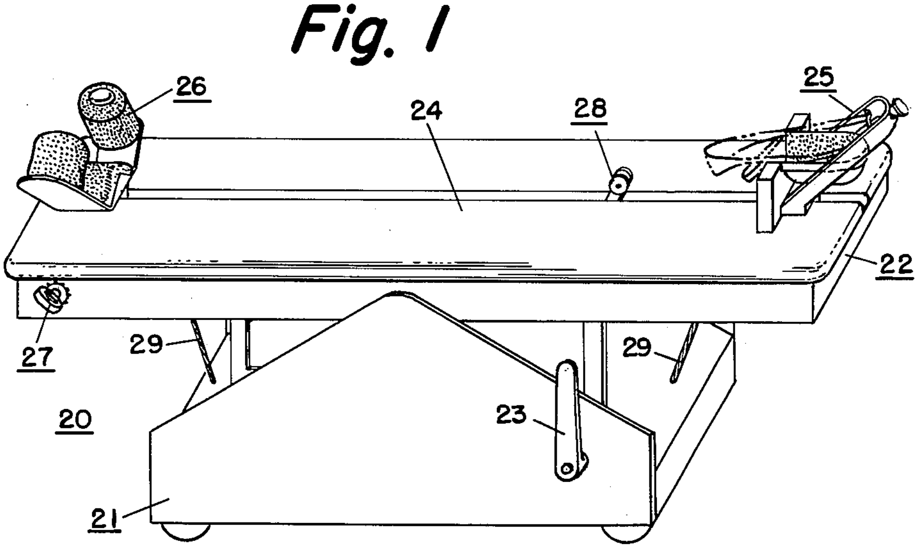
FIGURE 1 is a front perspective view of a medical treatment table embodying the principles of the invention.
Figure 3:
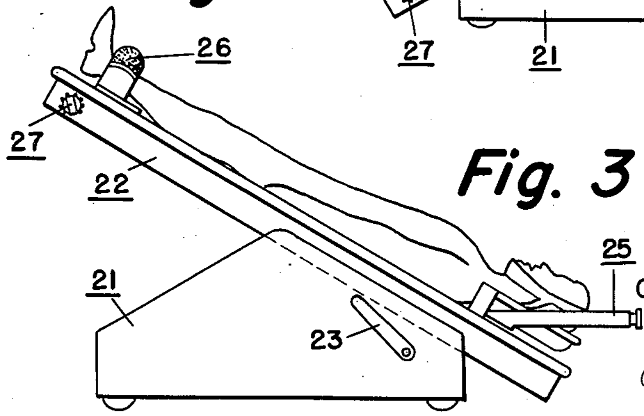
FIGURE 3 is a front elevational illustration of the treatment table of FIGURE 1 showing a patient lying thereon in head-downward position.

Before examining in detail the constructural aspects of the apparatus embodying our invention as seen in the showings of FIGURES 4 through 17, it will be helpful to consider first FIGURES 1, 2 and 3 for an understanding of the operation of the apparatus and the manner of achieving the desired beneficial results.

Examining first FIGURE 1, there will be seen a medical treatment table 20 having a base section generally designated at 21 and a table top section generally designted as 22. The table top 22 is pivotally supported at the center by means not shown and oscillates about such support in a repetitive four part cycle. The four part operating cycle will be discussed more fully hereinafter. The table top 22 is split into two longitudinally extending sections 24 centrally separated to define a slot within which is disposed a traveling roller assembly 28 adapted to move longitudinally in the slot first in one direction and then in the other as the table top 22 oscillates.

A head sling 25 and a foot clamping assembly 26 are seen to be located above the table top 22 at opposite ends thereof, and each of these assemblies is mounted on a carriage which is also not visible but which is adapted for movement longitudinally of the table top within the same slot wherein the roller assembly 28 moves. The head sling assembly 25 and foot clamping assembly 26 are coupled together for counter motion relative to one another so that they may be both moved toward each other or away from each other as desired to accommodate persons of different heights. The head sling 25 and foot clamping assembly 26 are shifted relative to one another by means of an adjustment and locking assembly 27 located near the foot clamping assembly 26. Extending outwardly from the base section 21 is an operating handle 23, which in the position shown in FIGURE 1 corresponds to a shut-down or non-operating condition of the oscillatable table top 22. In FIGURES 2 and 3 it will be observed that the operating handle 23 has been displaced counterclockwise from the vertical, and such position initiates the oscillatory cycle of the table top 22.

In using the apparatus a patient lies down on the table when the latter is in its stopped position as shown in FIGURE 1, and the head sling 25 and foot clamping assembly 26 are placed in proper position and adjusted by means of the mechanism 27. The operating handle 23 is then thrown to the left and the oscillatory cycle of the table top 22 is initiated. The cycle of operation is subdivided into four distinct parts comprising two transition periods and two dwell periods in alternation. FIGURE 2 illustrates a foot down position and corresponds to the first transition period which takes place immediately upon intiating the cyclic operation.

In FIGURE 2, it will be seen that the table top 22 has deviated from its horizontal position as seen in FIGURE 1 so that the patient's head is elevated and his feet are lowered. When the table top 22 reaches the position illustrated in FIGURE 2 further motion of the table top ceases and it remains motionless for a predetermined time interval. After the predetermined time interval has elapsed a second transition period begins wherein the table top 22 is again set in motion so that the feet are elevated and the head is depressed in the manner illustrated in FIGURE 3. Upon arriving at the position illustrated in FIGURE 3, motion of the table top 22 again is terminated and a second predetermined dwell time interval takes place at the end of which another transition period commences which restores the conditions seen in FIGURE 2.

This cycle of operation is repeated continuously so long as the operating handle 23 remains in the on or left-shifted position, and may be terminated by throwing operating handle 23 to its vertical position as seen in FIGURE 1 when, during either transition period, the table top 22 moves into its horizontal position. Although not necessary it has been found desirable to incorporate into the apparatus means for insuring that the table top may only be stopped when it is in its horizontal position.

In the showing of FIGURE 2, it will be see that the patient is supported by the head sling assembly 25 so that the force of gravity puts the spinal column under traction by causing the weight of the body to be supported primarily by the head. During the transition period which results in the foot down position shown in FIGURE 2, the roller 28 seen in FIGURE 1 moves downwardly in the slot in upwardly biased engagement with the spinal column and so provides for individual vertebra manipulation and stretching and separation. Similarly, in the head down position illustrated in FIGURE 3 the traveling roller moves from the lower end of the spinal column toward the neck region thereby again causing intervertebral separation, since in the position shown in the illustration of FIGURE 3 the body weight is supported solely by the foot clamping assembly 26. During the dwell times between the transition periods the roller assembly 28 remains motionless at one end or the other end of its travel.

It will thus be appreciated that the body fluids are alternately sent toward the feet and toward the head and that the body tissues and organs in these regions are first suffused with and then drained of blood. Simultaneously, traction is achieved by means of the alternate suspension of the body weight from the feet and from the head combined with the effect of the traveling roller 28. Although not visible in the showings of FIGURES 1, 2 and 3 means are also provided for gently vibrating the sections 24 of the table top 22, and the apparatus for carrying out this vibration will be described in connection with the showing of FIGURE 8. Although as will be seen subsequently the roller assembly 28 operates continuously so long as the table top 22 is oscillating, it is to be understood that such operation is not mandatory and that relatively simple means could be provided for the optional individual use of either the roller, the vibration, or oscillation of the table top or any combination of such.

Turning now to a joint examination of FIGURES 4 and 5 for an understanding of the basic mechanical aspects of the apparatus, there will be seen a main frame comprising a pair of spaced A frames, one of the A frames being formed from the angle iron members 30, 31 and 32, and the other of the A frames including the angle iron members 30', 31' and 32', the members 32 and 32' being the A frame cross members and the remainder comprising the A frame side members. Each of the A frames is bolted and welded together to form a rigid structure, and the cross members 32 and 32' are rigidly secured together by the angle iron members 35 and 35' which extend transversely of the table length. Bolted together and extending parallel to and substantially centrally between the spaced apart A frames are a pair of angle iron members 36 secured at opposite ends to the angle iron members 35 and 35' to thereby form a platform for supporting a motor and gear driving arrangement to be described subsequently. Tying together the lower ends of the A frames side members 30 and 30' is a transversely extending angle iron member 33, and a similar member 33' secures together the lower ends of the A frames side members 31 and 31'. Underlyingly mounted to the tie members 33 and 33' are a plurality of casters 34 to permit moblity of the entire apparatus.

Turning now to a general consideration of the table top structure, there will be seen a pair of parallel extending spaced apart side frame angle iron members 40 secured at opposite ends of the table top to transversely extending angle iron members 43, only one of which may be seen in the showing of FIGURE 5. Extending parallel to and at the same elevation as the side frame angle iron members 40 are a pair of space apart substantially centrally located angle iron members 44 which are also secured at opposite ends to the transverse end frame angle members 43. For dress purposes a pair of side panels 41 are secured to the angle iron side members 40 by screws 42.

Extending transversely of the table top and directly underlying and clamped to the angle iron side members 40 by U bolts 46 is a shaft 45. This shaft 45 is seated in notches cut into the vertically extending flange portion of each of the A frames' side members 30 and 30', these notches providing a bearing within which the shaft 45 may be rotated. In order to insure that the shaft 45 may not be displaced out of the bearing notches in the A frame members 30 and 30′ under any conditions of apparatus operation, the U bolts 47 are provided, these U bolts being secured to the outwardly extending flange portions of the angle members 30 and 30′. It should now be appreciated that the table top is pivotally secured to the base section A frames by the shaft 45 and U bolts 46 and 47, and that the shaft 45 provides a pivotal axis about which the entire table top may be oscillated.

Before considering the means for oscillating the table top about the axis of the shaft 45, the start-stop mechanism will be first described. The start-stop mechanism includes generally the operating handle 23 and the electrical switch 63 best seen in FIGURE 5, the linkage members 50, 52, 54 and 57 and rollers 55 and 60. As best seen in the showing of FIGURE 4, a T member 57 is secured at the lower end of the vertically extending portion to the A frame member 31′ by pivot means 59, and the upper end of the vertically extending portion is pivotally secured to a roller 60 which contactingly underlies the table top side frame angle member 40. The horizontally extending portion of the T member 57 is pivotally linked as at 58 to one end of a linkage member 54, the other end of the linkage member 54 being pivotally secured to a roller 55 and a vertically depending linkage member 52 by the pivot means 56. The lower end of the linkage member 52 is pivotally secured to a support block 50 which latter is rigidly bolted to the A frame side member 30′ by the bolts 51.

Referring now to FIGURE 5, it will be seen that the linkage member 52 is pinned to the pivot shaft 53 by the means 62, and that additionally the operating lever 23 and switch 63 are similarly pinned to the pivot shaft 53. Since the operating lever 23, linkage member 52 and switch 63 are all pinned to the pivot shaft 53, it is clear that when the operating lever 23 is pivoted, as for example in the manner shown in FIGURE 2 and 3, that the switch 63 and linkage member 52 will rotate with the pivot shaft 53 to which they are pinned. Rotation of the switch 63, which may for example be a mercury switch, will close the contact thereof and allow electrical energy to be transferred from a power source to an electrical motor 65 via the conductor cables 61 and 64. Energization of the motor 65 will initiate oscillatory motion of the table top in the manner to be described subsequently.

However, before such oscillatory motion can be imparted to the table top it is necessary to release the toggle locking device which firmly holds the table top in its horizontal position. This locking device is, of course, the roller and linkage assembly just described, and it will be clear from a re-examination of FIGURE 4 that the roller and linkage toggle assembly as seen therein effectively locks the table top against rotation about the axis of the shaft 45. The bolt and linkage assembly just described and illustrated in FIGURE 4 in table locking position is released simultaneously with the actuation of the switch 63 by means of the operating handle 23.

When the lever 23 is pivoted inward toward the center of the table as seen in FIGURES 2 and 3, the linkage member 52 pivots with the shaft 53 in a clockwise direction as referenced to the showing of FIGURE 4. Thus, the pivot 58 connecting the linkage members 54 and 57 is forced substantially vertically downward and the rollers 55 and 60 rotate inward and downward respectively along arcs of circles having centers at the pivots 53 and 59 so that these rollers 55 and 60 are disengaged from the undersurface of the side frame angle members 40 of the table top and come to rest in a lowered noninterfering position and free the table top from restraint aginst oscillatory motion about the axis of the shaft 45. Of course, when it is desired to stop the oscillatory motion of the table top the operating handle 23 is rotated backward into its vertical position which opens the switch 63 to stop the motor 65 and brings the roller linkage toggle assembly back into locking engagement with the table top as seen in FIGURE 4. Obviously, the stopping of the apparatus can only be accomplished when the table top is substantially horizontal since in positions of substantial deviation therefrom one of the rollers 55 or 60 is precluded from rising by virute of the fact that it will prematurely engage the downward sloping undersurface of the table top side frame member 40.

Turning now to a consideration of the mechanism for driving the table top 22 through its oscillatory cycle, there will be seen in FIGURE 4 a motor 65 connected to a gear speed-reduction mechanism 66 by a coupling and shaft 67. Driven by the motor 65 through the speed reducing mechanism 66 and extending outwardly therefrom is a shaft 68 which drives a pulley 69. The pulley 69 is coupled to a second pulley 70 by means of a belt 71. The pulley 70 is keyed to a shaft 72 which is journalled in bearings 73 and 74, these bearings being respectively anchored to the angle iron members 36 and 32. Also fixedly mounted on the shaft 72 for rotation therewith are a gear 75 and a crank 76. Extending about the gear 75 and upwardly therefrom is a chain 77 trained around a second gear 78 fixedly mounted to a shaft 79 extending transversely between the A frames and mounted to the A frames, side members 30′ and 30 respectively by pillow blocks 80 and 81.

Secured to the shaft 79 at the right-hand end thereof, as viewed in FIGURE 5, for rotation therewith is a crank 82. Secured to the free end of the crank 82 by pivot means 90 and depending downward therefrom is a link member 83, the link member 83 being pivotally connected at its bottom end by means 91 to a horizontally extending link member 84, which latter is in turn pivotally connected at its opposite end by means 92 to the free end of the crank 76. Pivotally connected to the horizontal link member 84 by the pivot means 85 is an upwardly extending link 86. The upper end of the link member 86 is secured to the angle plate 87 by pivot means 88 which extends through one of a series of three holes 19 cut through the angle plate 87, the angle plate 87 being fixedly secured to the underside of the angle iron side frame member 40 of the table top 22 by the bolts 89. The maximum inclination of the table top 22 to the horizontal is controlled by the distance between the pivot 88 and the axis of the shaft 45, the largest inclination being obtained with the smallest distance. Thus, by shifting the pivot connection 88 to the left-handmost hole 19 in the angle plate 87 oscillatory motion of least amplitude will be provided.

By means of the just described structure the four-part operating cycle previously mentioned is achieved. For purposes of illustration it may be considered that the gear 75 rotates at a speed of three revolutions per minute and that the gear 78 driven thereby through the chain 77 rotates at a speed of one revolution per minute. It is, therefore, seen that the crank 76, which rotates at the same rate as the gear 75, will move through three quarters of a revolution for each one quarter revolution of the crank 82 which rotates at the same rate as the gear 78. One complete four-part cycle of operation takes place for each complete revolution of the crank 82, each part of the cycle lasting approximately fifteen seconds and corresponding to a ninety degree rotation of the crank 82.

Referring now to FIGURES 15, 16 and 17 in conjunction with FIGURE 4, it will be seen that the circles of FIGURES 15 and 16 are each divided into four quadrants. In FIGURE 15, the quadrant which is defined by the arc of the circle lying between the points W and X defines a fifteen second time interval during which a head upward dwell period takes place, during which the patient remains in the position seen in FIGURE 2. Continuing clockwise around the circle from point X, there will be seen a down transition interval which occurs between the points X and Y and during which the patient on the table is shifted from a head upward to a head downward position corresponding to a transition from the showing of FIGURE 2 to that of the showing of FIGURE 3. The down transition is followed by a down dwell period as defined between the points Y and Z in FIGURE 15 and in which the patient remains in the position illustrated in FIGURE 3. Finally, an up transition as defined between the points Z and W in FIGURE 15 takes place in which the patient's position is restored from that of FIGURE 3 to that of FIGURE 2, upon which the foregoing described cycle is repeated continuously until the apparatus is shut down.

The circle of FIGURE 15 corresponds to the path of motion of the pivot 90 which connects the link member 83 to the crank 82 as seen in FIGURE 4. The circle of FIGURE 16 corresponds to the path of motion of the pivot point 92 which connects the link member 84 to the crank 76. It should be remembered that since the crank 82 makes one complete revolution for each three revolutions of the crank 76, that the pivot point 90 as seen in FIGURE 15 will traverse one quarter of the circular circumference, as for example between the points W and X, during the time interval in which the pivot point 92 as shown in FIGURE 16 traverses three quarters of the circle circumference, as for example between the points A and D in a clockwise rotational sense.

Thus, during a head-up dwell period as the pivot 90 moves around the circumference from point W to point X its vertical displacement upward and then downward will be equal to the length R as indicated on FIGURE 15. At the same time that this upward and then downward displacement R of the point 90 is taking place, an oppositely directed vertical motion will be experienced by the pivot 92. That is, the pivot 92 will move downward and then upward for a vertical distance corresponding to the length H as indicated in FIGURE 16. The vertical displacement H of the pivot 92 is, of course, directly translated into an identical motion of the left-hand end of the link member 84 as seen in FIGURES 4 and 17, and the vertical directed motion of the pivot 90 is translated substantially, but not exactly, into a similar motion at the pivot 91 located at the right-hand end of the link 84 as seen in FIGURES 4 and 17.

Since, during the dwell period, it is necessary to hold the table 22 substantially motionless, it will be apparent from the showing of FIGURE 4 that the link member 86 should either remain motionless or should pivot about the pivot means 88 at the upper end thereof without introducing a vertical thrust to the angle plate 87. The absence of vertical thrust on the link 86 will be achieved if the pivot point 85 at the bottom end thereof remains substantially motionless. Assuming that a linear relationship exists between the displacements R and H illustrated in FIGURES 15 and 16 and referred to the showing of FIGURE 17, it will be appreciated that the point 85 may be held motionless by properly choosing the ratio between the distance L and the distance L'. It may be shown that $$L=\frac{H}{R}L'$$

and that the ratio $$\frac{H}{R}$$

is easily determinable by simple geometric relationships in terms of the effective length of the crank 82 and the crank 76. A similar condition occurs during the down dwell period during which time the pivot point 90 moves clockwise from the point Y to the point Z on the circle of FIGURE 15, and the pivot 92 moves clockwise from the point C to the point B on the circumference of the circle of FIGURE 16.

During the down transition when the pivot 90 moves downward between the points X and Y on the circle of FIGURE 15 the pivot 92 moves around the circle of FIGURE 16 from the point D to the point C in clockwise direction, and hence the motion of both of these pivot points is essentially downward resulting in a downward shifting of the pivot 85 and the table top 22. Similarly, during an up transition the pivot 90 moves along the circle of FIGURE 15 from the point Z to the point W and the pivot 92 moves around the circle of FIGURE 16 from the point B to the point A, hence both pivot points essentially move in an upward direction and the pivot 85 is carried upwardly to shift the table top 22 in an upward direction. It should also be noted that at the beginning and the end of each transition period the motion of the pivot 92 is directed oppositely to the motion of the pivot 90 and hence results in a slow speed beginning and ending of each transition and hence avoids applying high acceleration force to the patient's body. Although the foregoing described motion of the pivot points 91 and 92, and hence also the motion of the pivot 85, are not quite as simple as described, the described motions are essentially correct and in fact result in the cyclic operation of the table top 22 in the manner hereinbefore set forth.

FIGURES 11 through 14 illustrate the various geometrical relationships amongst the table top 22 and the mechanical driving system connected thereto for producing the cyclic motion as described. Figure 11 illustrates the relative positions of the cranks 82 and 76 at the end of an up transition period and the beginning of an up dwell period. FIGURE 12 illustrates the end of the up dwell position and the beginning of a down transition period. It will be noted that although the table top 22 has remained in the same position during the dwell period, the crank 82 has rotated the pivot point 90 from a position corresponding to the point W on the circle of FIGURE 15 to the point X, and that the pivot 92 on the crank 76 has moved around the circle of FIGURE 16 from the point A to the point D.

FIGURE 13 illustrates the end of the down transition and the beginning of a down dwell, and it will be observed that the table top 22 has been countershifted from the position seen to have been occupied in the showings of FIGURES 11 and 12. FIGURE 14 illustrates the end of the down dwell and the beginning of the up transition. The motion of the pivots 90 and 92 of FIGURES 13 and 14 will be seen to correlate exactly with the diagrams of FIGURES 15 and 16 as already described.

Understanding now the structure of and manner of operation of the apparatus for carrying out the four-part oscillatory cycle of the table top, attention should be directed to the showings of FIGURES 6 and 7 for an understanding of the operation of the roller assembly 28 and the means for carrying out adjustment of the head sling assembly 25 and foot clamping assembly 26 to accommodate patients of varying heights. Examining first FIGURE 6, there will be seen a plurality of rollers 108, 109, 111 and 112 mounted to the underside of one of the angle iron members 44 by the means 170 not seen in the showing of FIGURE 6, but which are illustrated in FIGURE 4. The cable 29 seen to be anchored to the base section of the table in the showing of FIGURE 4 extends upwardly and over the pulley 108. The cable 29 then extends toward the right from the top of the pulley 108 and downwardly to run under and upward and around the pulley 109, reversing its direction and extending toward the left to securement with the carriage 102 by means of the clamp 110. Continuing in extent from the clamp 110 and outward toward the left, the cable 29 extends over and down and around the pulley 111, again reversing its direction and extending toward the right over and down around the pulley 112 to securement with the table base at the end thereof nearest the foot clamping assembly 26.

The carriage 102 supported by the wheels 101 pivotally mounted thereto at the carriage ends is substantially the same as the carriage 120 seen in FIGURE 7 which supports the foot clamping assembly 26. Reference is made to the carriage assembly 120 of the foot clamping assembly because an end view of this carriage may be seen in the showing of FIGURE 5, and the details of the carriage and the tracks within which the carriage wheels run are most clearly seen in the showing of FIGURE 5. As seen in FIGURE 5, a pair of angle irons 100 are welded to the previously described angle iron members 44 running longitudinally and substantially centrally of the table top 22. The wheels 121 associated with the foot clamping assembly carriage 120 are affixed to the latter in the same manner as are the wheels 101 of the roller assembly carriage 102 seen in FIGURE 6.

Projecting upwardly from the left-hand end of the roller assembly carriage 102 is a stud 106 to which is secured one end of a spring 107. The opposite end of the spring 107 is connected to the arm 104 which supports the roller 105 at its upper end, the lower end of the arm 104 being pivotally secured to a bracket 103 extending upward from the carriage 102 adjacent the right-hand end of the latter. The spring 107 is seen to be organized in such a way with the roller arm 104 that the roller 105 is biased upwardly so that the latter may be yieldably engaged with the spinal column of a patient lying upon the table top, and hence as the carriage 102 moves longitudinally of the table top 22 the roller arm 104 will pivot about the bracket support 103 and allow the roller 105 to move vertically in conformance with the contour of the patient's spinal column.

Since the cable 29 is secured to the carriage 102 by means of the clamp 110, it is easily seen that when the left-hand end of the table moves upward during an oscillation of the table top the carriage 102 and hence the roller 105 will move toward the right. Thus, since the force of gravity tends to place the spinal column in tension by attempting to shift the body downward toward the right as the right-hand end of the table drops, it will be appreciated that the roller 105 moving toward the right acts in concert with the force of gravity and tends to produce intervertebral separation. Similarly, of course, when the right-hand end of the table rises and consequently the patient's weight is shifted downward toward the left, the roller 105 now travelling toward the left will again produce intervertebral separation.

Turning now to an examination of FIGURE 7, there will be seen at the right-hand end thereof the foot clamping assembly carriage 120 mounted on the wheels 121 and riding in the angle iron members 100 in the manner previously described in conjunction with the showing of FIGURE 5. Secured to the carriage 120 is a vertically projecting bracket 123 having mounted to the top thereof a plate 122, which latter carries a pair of outwardly diverging plate members 124. Mounted to the plates 124 near their outer ends are a pair of padded foot clamping rolls 126 secured to the plate members 124 by the shafts 127. These shafts 127 extend through the padded rolls 126 in off-center relationship to the cylindrical axis of each of the rolls.

Secured to the free end of the shafts 127 are a pair of locking handles 128, which when loosened allow the rolls 126 to be rotated about the shafts 127 and to be secured in a desired position by then tightening down the handles 128. A padded arch 125, as seen in the showing of FIGURE 5, is also secured at opposite ends to the members 124, to form a cushioned clamping assembly with the padded rolls 126. In use, the patient's legs are projected between the padded arch 125 and the padded rolls 126 in the manner seen in the showings of FIGURES 2 and 3. From FIGURES 2 and 3 it will be appreciated that the rear of the ankle rests upon the padded arch 125 and the eccentrically mounted padded rolls 126 are rotated downward into engagement with the front of the ankle and then secured by the locking handles 128.

At the opposite end of FIGURE 7, there is seeen the head sling assembly 25 which again includes a carriage 130 mounted on wheels 131 for travel along the angle iron tracks 100 in exactly the same way as the carriages of the roller assembly 28 and foot clamping assembly 26. Extending upwardly from the carriage 130 is a bracket 133 having a plate 132 mounted at the top thereof, the plate 132 in turn having secured thereto and carrying a padded head rest 135 and a shoulder stop 134 containing a cut-out region for accommodating the patient's neck. Also secured to the plate 132 is a U-shaped head sling bracket 136, a perspective view of which may be seen in the showing of FIGURE 1. Threadedly projected through the base wall of the U-shaped head sling bracket 136 is an eye bolt 137 which may be adjusted lengthwise of the U bracket by means of the rotatable handle 139. The head sling proper 138 which includes a chin strap is pivotally connected to the eye of the eye bolt 137 so that the head sling 138 is adjustably carried by and moves with the eye bolt 137 as the latter is shifted longitudinally of the head sling U bracket 136 by means of the knob 139.

Rotatably mounted to the underside of the table top 22 by means not visible on the showing of FIGURE 7 is a shaft 150 upon which are mounted a small diameter pulley 149 and a larger diameter pulley 147. At the right-hand end of the table top 22 as seen in FIGURE 7, is mounted a second shaft 153 which carries thereon a small gear 141 and a larger gear 142. Trained around the small gear 141 is a sprocket chain 145 to the ends of which are connected opposite ends of a cable 148. Cable 148 crosses itself in "figure 8" fashion as it extends toward the left, where it will be seen that this cable loops around the small pulley 149 and is connected at an intermediate point to the head sling carriage 130 by means of the clamping bracket 140.

Similarly, a second sprocket chain 144 is trained about the larger gear 142 and is connected at its opposite ends to the ends of a cable 146. The cable 146 extends the length of the table toward the left and wraps about the larger pulley 147 to securement with the foot clamping assembly carriage 120 by means of the clamping bracket 129. When, by means of the adjustment mechanism which will be described in connection with the showing of FIGURE 8, the gears 141 and 142 are simultaneously rotated in the same direction, it will be appreciated that the carriages 120 and 130 must move in opposite directions either toward one another or away from one another. The oppositely directed motions of the carriages 120 and 130 are brought about by the fact that whereas the cable 146 extends between the pulley 147 and gear 142 in a straight loop, the cable 148 which extends between the pulley 149 and the gear 141 is transposed in a "figure 8" loop, thus, causing the pulleys 147 and 149 to counter-rotate relative to each other on the shaft 150.

Turning now to an examination of FIGURE 8 for an understanding of the adjusting mechanism by which the head sling assembly 25 and foot clamping assembly 26 may be adjusted relative to one another by rotation of the gears 141 and 142, it is seen that the shaft 153, upon which are mounted the gears 141 and 142 engaged with the sprocket chains 144 and 145, is supported by a pair of angle iron brackets 151 and 152 secured to the underside of the angle iron members 44. The shaft 153 is extended into a hollow tube 155 which latter is slotted at its left-hand end so that a pin 154 extending through and secured to the shaft 153 may ride in the slot 156 and thus result in relative axial shifting between the shaft 153 and hollow tube 155. It will be appreciated that although the tube 155 can ride longitudinally of the shaft 153, yet when the tube 155 is rotated it will carry the shaft 153 with it by virtue of the transversely extending pin 154 secured to the shaft 153.

The hollow tube 155 is pin connected at its right-hand end by means of the pin 160 to a shaft 159 which extends outwardly through the side 41 of the table top 22 and is fastened to a gear 164 by means of the key 163, the gear 164 being pinned to an operating handle 158. Fixedly mounted to the outside of the hollow tube 155 is a washer 157 which acts as a stop for the compression spring 161 disposed about the length of the hollow tube 155 between the washer 157 and the angle plate 162, the latter being secured to the underside of the table top angle iron member 40. A plate 165 is secured to the outside of the side member 41 of the table top 22 and is centrally apertured to permit passage of the shaft 159 therethrough. Projecting outwardly from the plate 165 are a pair of studs 166 and 167 spaced apart so that these studs project between the teeth of the gear 164, and prevent the gear from being rotated so long as the compression spring 161 maintains the gear face seated inwardly against the plate 165.

In order to adjust the head sling carriage and foot clamping assembly carriage by rotation of the gears 141 and 142, the handle 158 is pulled outwardly, toward the right as viewed in FIGURE 8, to cause the teeth of the gear 164 to clear the studs 166 and 167. Such displacement of the handle 158, of course, also causes the shaft 159 and hollow tube 155 to be displaced outwardly toward the right, and places the spring 161 in compression. Rotation of the handle 158 now causes the gears 141 and 142 to be rotated by virtue of the pin connection 154 between the hollow tube 155 and the shaft 153.

When the head sling and foot clamping carriages have been adjusted to the desired positions, the handle 158 may be released and the spring 161 will cause the shaft 159 to move inward, thus again seating the gear 164 against the face of the plate 165 with the studs 166 and 167 projecting outwardly between the teeth of the gear. The studs 166 and 167 prevent rotation of the gear 164 and hence lock the gears 141 and 142 against further rotation, thereby in turn locking the head sling and foot clamping assembly carriages.

Also seen in the showing of FIGURE 8 is the apparatus for producing gentle vibration of the table top 22. This apparatus consists of an electric motor 38 having an eccentric weight 39 secured to the motor shaft, said motor being supported by and secured to a mounting plate support member 49 by means of the bolts 37. When the motor 38 is energized and the shaft rotates, the eccentric weight 39 causes the entire motor to vibrate by providing an unbalanced dynamic load. The vibratory action of the motor and eccentric assembly is imparted to the top boards 24—24 of the table top 22 by suitably connecting the motor mounting plate 49 to the top boards 24—24 by means of a plurality of intervening resilient support structure assemblies 48. This vibration is transmitted to the two longitudinally extending boards 24 which comprise the surface upon which the patient is resting.

Turning now to an examination of FIGURE 10, it is seen that each of the resilient support structure assemblies 48 includes a resilient tubular member 174 secured to the table top frame by means of a bolt 172 threaded into and projecting upwardly from the angle iron member 40 and secured by the nut 173, and secured to the patient-supporting boards 24 by a bolt 170 and nut 171. The bolts 170 and 172 are end-spaced from each other so that the resilient tubular member 174, which may be made for example from rubber, is free to flex in its central region. Thus, the somewhat rough vibration of the motor 38 is smoothed out by means of this flexible coupling.

Having now described our invention in connection with a particularly illustrated embodiment thereof it will be apparent that various modifications will now naturally occur to those persons normally skilled in the art without departing from the essential spirit or scope of our invention, and it is therefore intended to claim the same broadly as well as specifically as indicated by the appended claims.

What is claimed as new and useful is:

1. A treatment table comprising in combination a table top, a base section underlying said table top, first coupling means coupling said table top to said underlying base section whereby said table top is supported by said base section, drive means coupled to said table top and to said base section, and control means coupled to said drive means for selectively actuating said drive means, said drive means being effective responsive to actuation by said control means to cause said table top to oscillate in a vertical plane about said first coupling means, said drive means comprising a pair of spaced apart crank arms each rotatable at one end thereof in the same sense about parallel axes, the free end of one crank arm being pivotally connected to one end of a first link member and the free end of the other crank arm being pivotally connected to one end of a second link member, the free ends of said first and second link members being pivotally connected together, a third link member pivotally connected at one end to a point intermediate the ends of said first link member and being pivotally connected at the other end to said table top at a point spaced from said first coupling means, said crank arms being of different effective lengths and being mechanically coupled to move synchronously at predeterminedly different rotational speeds, the combined rotational motions of said pair of crank arms producing a compound cyclic motion of said first link member which causes a translational displacement of said third link member resulting in a rotational displacement of said table top about said first coupling means in a first rotational sense, followed by a time interval of substantially zero translational displacement of said third link member, followed by a translational displacement of said third link member resulting in a rotational displacement of said table top about said first coupling means in a second rotational sense opposite to said first rotational sense, followed by a time interval of substantially zero translational displacement of said third link member.

2. A treatment table comprising in combination a table top, a base section underlying said table top, first coupling means coupling said table top to said underlying base section whereby said table top is supported by said base section, drive means coupled to said table top and to said base section, control means coupled to said drive means for selectively actuating said drive means, said drive means being effective responsive to actuation by said control means to cause said table top to oscillate in a vertical plane about said first coupling means, and table top locking means coupled to and actuated by said control means for locking the table top in horizontal position when said control means deactuates said drive means, said locking means being released when said control means actuates said drive means, said locking means comprising a pair of rollers engagingly underlying said table top on opposite sides of said first coupling means and each connected to one end of different ones of a pair of link members forming part of a toggle assembly, said pair of link members being themselves pivotally connected together, said locking means being released by said control means by breaking the toggle to cause the last named pivotal connection to move downward and carry the said rollers downward and inward toward one another and out of engagement with said table top.

3. A treatment table comprising in combination a table top, a base section underlying said table top, first coupling means coupling said table top to said underlying base section whereby said table top is supported by said base section, drive means coupled to said table top and to said base section, and control means coupled to said drive means for selectively actuating said drive means, said drive means being effective responsive to actuation by said control means to cause said table top to oscillate in a vertical plane about said first coupling means in a repetitive four-part cycle comprising, a first transition period wherein one end of the table top is moved a predetermined distance downward relative to the horizontal to thereby produce a first inclined position of the table top, followed by a first dwell period wherein the table top is maintained substantially motionless in the said first inclined position at the end of the first transition period for a first predetermined time interval, followed by a second transition period wherein said one end of the table is moved upward through the horizontal and for a predetermined distance thereabove to thereby produce a second inclined position of the table top, followed by a second dwell period wherein the table top is maintained substantially motionless in the said second inclined position at the end of the second transition period for a second predetermined time interval, a roller assembly including a roller disposed above the top surface of the table top, and means coupled to said roller assembly effective to shift said assembly rectilinearly centrally lengthwise of the table top as said table top oscillates about said first coupling means, said roller assembly remaining motionless during the said dwell periods, said roller assembly moving lengthwise of the table top away from said one end during said first transition period and said roller assembly moving lengthwise of the table top toward said one end during said second transition period, said roller assembly comprising a wheeled carriage disposed to ride in tracks extending longitudinally centrally of the table top below the top surface thereof, said carriage carrying said roller and being secured to a cable which is trained around a pair of pulleys secured to said table top and spaced on opposite sides of said first coupling means, the opposite ends of said cable being fixedly secured to opposite ends of said underlying base section.

4. A treatment table comprising in combination a table top, a base section underlying said table top, first coupling means coupling said table top to said underlying base section whereby said table top is supported by said base section, drive means coupled to said table top and to said base section, control means coupled to said drive means for selectively actuating said drive means, said drive means being effective responsive to actuation by said control means to cause said table top to oscillate in a vertical plane about said first coupling means, a head sling assembly and a foot clamping assembly disposed respectively at opposite ends of the table top, and means for counter-shifting said assemblies relative to each other lengthwise of the table top, whereby persons of different heights may be readily secured to the table top for treatment, said head sling assembly and said foot clamping assembly each comprising a wheeled carriage disposed to ride in tracks extending longitudinally centrally of the table top below the top surface thereof, said carriages each being secured to a different one of a pair of separate cables, said cables being each trained around a different one of a pair of separate pulleys mounted to said table top proximate one end thereof, the ends of each cable being secured to the ends of a different one of a pair of separate sprocket chains, said sprocket chains being each trained around a different one of a pair of gears coaxially fixedly mounted on a lockable rotatable shaft, and means for unlocking said shaft for simultaneous rotation of said gears and then relocking said shaft.

5. The treatmnet table according to claim 4 wherein said means for unlocking, rotating, and relocking said lockable rotatable shaft comprise, a hollow tube slotted longitudinally at one end thereof and having disposed coaxially therein at said slotted end a free end of said lockable shaft, said lockable shaft having a pin extending transversely thereof proximate said free end with a projecting pin end extended into said slot, said hollow tube being fixedly secured at its opposite end to an operating handle assembly adapted for rotating said tube about its cylindrical axis, said handle assembly including a member fixed to an operating handle and rotatable therewith which is formed with a plurality of keyways interlockable with a key fixedly secured to the said table top, and biasing means coupled to said hollow tube for biasing said keywayed member into interlocking engagement with said key, said handle being operable to overcome the bias provided by said biasing means to thereby disengage the key interlock and being rotatable to thereby rotate said lockable rotatable shaft to shift said head sling and foot clamping assemblies, said biasing means relocking said handle assembly when said handle is released.

References Cited in the file of this patent

UNITED STATES PATENTS

| | | |
|---|---|---|
| 937,825 | Lend | Oct. 26, 1909 |
| 1,322,720 | Nobel | Nov. 25, 1919 |
| 1,480,136 | Wurtz | Jan. 8, 1924 |
| 1,643,040 | Wentz | Sept. 20, 1927 |
| 1,915,841 | Warner | June 27, 1933 |
| 2,073,524 | Monk | Mar. 9, 1937 |
| 2,429,834 | Madden | Oct. 28, 1947 |
| 2,446,275 | Glasin | Aug. 3, 1948 |
| 2,475,289 | MacGregor | July 5, 1949 |
| 2,655,915 | Brand | Oct. 20, 1953 |
| 2,660,999 | Thornton | Dec. 1, 1953 |
| 2,847,196 | Franklin | Aug. 12, 1958 |
| 2,874,689 | Gavelek | Feb. 24, 1959 |

FOREIGN PATENTS

| | | |
|---|---|---|
| 1,040,137 | France | May 20, 1953 |